United States Patent Office 3,489,668
Patented Jan. 13, 1970

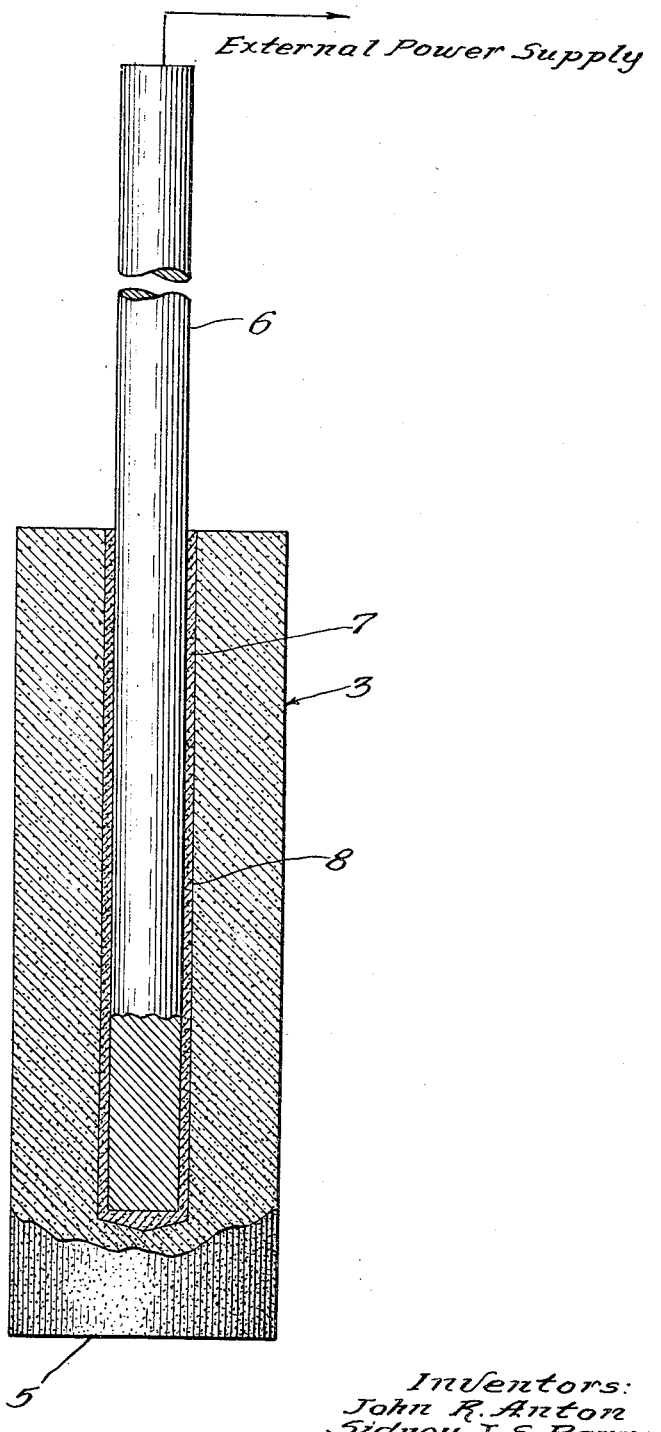

3,489,668
CONNECTIONS BETWEEN ELECTRICAL CONDUCTORS AND CARBON BODIES
John R. Anton, Kenmore, Sidney J. S. Parry, Youngstown, and Wayne A. Anderson, Tonawanda, N.Y., assignors to Great Lakes Carbon Corporation, New York, N.Y., a corporation of Delaware
Filed Apr. 27, 1966, Ser. No. 545,612
Int. Cl. B01k *3/04;* C23b *5/70, 5/72*
U.S. Cl. 204—286                    7 Claims

ABSTRACT OF THE DISCLOSURE

Low electrical resistance connections are made between carbon bodies and electrical conductors. The carbon body is provided with a recess. The electrical conductor is embedded within the recess and secured to the carbon body by an alloy within the recess between the carbon body and the conductor. The alloy is heated above its melting point, and is then cooled to solidify it within the recess. The alloy expands or exhibits cumulative growth during and after solidification, thus forming a connection of low electrical resistance and good strength.

Typically the carbon body may be a graphite lead-in rod, the electrical conductor a copper rod, and the connections made are for use in electrolytic cells.

---

This invention relates most particularly to graphite pins for mercury cell anode plates and end connector plates for chlorate cells, and joints between such pins and end connector plates and copper bars. More broadly, the invention relates to unique connections between an electrical conductor and a carbon body which can be used for any purpose, such as in electrolytic cells, or elsewhere.

Several designs of mercury-cathode chlor/alkali cells use graphite pins or stems to support the anode plates and carry the operating current through the cell cover from the external current source to the anode plate. Such pins are illustrated in the accompanying drawing. These pins 3 typically have a hole or recess drilled in their center and a copper bar or rod 6 fixed in this hole and extending above the top end of the graphite pin. The diameter of the copper bar is less than the diameter of the hole in the graphite and the annular space 8 between the copper and graphite is filled with an electrically conducting material 7 by means of which a connection is made between the copper and graphite which is intended to be mechanically strong and to have low electrical resistance. The end 5 of pin 3 is used for coupling to the anode plate in order to support said plate, this connection typically being made by press-fitting the pin 3 into a mating cylindrical hole in the top of the anode plate.

End connector plates for chlorate cells, also typically made of graphite, may employ the same type connection and have a hole drilled through most of their length near one edge. A copper bar fixed in this hole and the end of the bar extends above the top of the graphite plate. The diameter of the copper bar is smaller than the diameter of the hole in the graphite plate and, as in the case of the graphite pins just described, this annular space between the copper and the graphite is filled with an electrically conducting material by means of which a connection is made between the copper and graphite which is intended to be mechanically strong and to have a low electrical resistance. The end connector plates are typically reinforced by graphite reinforcing strips which are cemented to the plate near the edge having the hole drilled therein.

The present invention is chiefly concerned with and has as one of its objects the making of a low-electrical resistance, high-strength joint between an electrical conductor, such as a copper rod, and a lead-in rod, such as a graphite pin, which lead-in rod can conveniently be used as an electrical coupling to an anode of an electrolytic cell; and/or to the making of such joints in end connector plates for chlorate cells. The invention, however, is applicable to any such low-electrical resistance, high-strength joint made according to the teachings of this invention, no matter wheresoever or howsoever used. The present invention has also as one of its objects the making of such a joint by using novel materials, which offer several advantages over many materials utilized in the past to make such joints, such as reduced voltage drop through the joint and reduced cost of making the joint. Further other objects and advantages will become apparent after a review of the description of the present invention, and the comparison of same with other practices in the art.

It is a finding of the present invention that an electrical conductor, such as a copper rod, can conveniently and advantageously be coupled to a lead-in rod or a graphite pin or a carbon body having a recess therein by means of an alloy which has been heated to a temperature above its melting point and which alloy has then been permitted to cool below its melting point within said recess, said alloy being characterized by its exhibiting a cumulative growth during and after solidification thus causing a tight mechanical bond between the carbon body and the electrical conductor and thus forming a low resistance electrical connection; said alloy being further characterized by having a melting point between about 95° C. and about 300° C. The alloy also typically possesses an electrical resistivity between about $0.5 \times 10^{-5}$ and about $5.0 \times 10^{-5}$ ohm-inches and preferably no higher than $10 \times 10^{-5}$ ohm-inches. It is preferable also that the alloy "wet" or bond to the electrical conductor (e.g. to the copper rod if that is what is used).

There are many alloys which fulfill the foregoing requisites and which can be employed in the invention. The following compositions, wherein the numbers are approximate percentages by weight, and having the properties set forth opposite same, are typical or preferred alloys which may be used:

| Alloy | Properties | |
|---|---|---|
| | Melting temperature or range (° C.) | Electrical resistivity of alloy in ohm-inches |
| (a) 58 bismuth, 42 tin | 138 | $1.35 \times 10^{-5}$ |
| (b) 55.5 bismuth, 44.5 lead | 124 | $3.45 \times 10^{-5}$ |
| (c) 48 bismuth, 28.5 lead, 14.5 tin, 9 antimony | 103–227 | $2.62 \times 10^{-5}$ |
| (d) 15 antimony, 58 lead, 26 tin, 1 copper | 230–280 | $0.82 \times 10^{-5}$ |
| (e) 15 antimony, 82 lead, 3 tin | 275 | $0.49 \times 10^{-5}$ |

Because of the fact that all of the foregoing alloy exhibit a cumulative growth during and after solidification (as a result of expansion either upon being cooled from their molten state to their solid state, and/or because of linear growth after solidification), a very tight joint or connection is made between the electrical conductor and the carbon body which is mechanically strong and has a very low electrical resistance when any of these alloys is used in making the connection. This low resistance of the joint is due not only to the fact that the joint is tight but also to the fact that the thickness of the alloy in the annular space 8 between the pin 3 and the conductor 6 is kept to a minimum (consistent with attaining good joint strength) so that the resistivity of the alloy itself contributes only in a small proportion to the total resistance of the joint.

Before the connection is made, the electrical conductor or copper bar or rod is generally prepared for use by mechanical and/or chemical cleaning, and tinned throughout the length that will be enclosed by the carbon body or graphite with ordinary tin-lead solder. The carbon body or graphite stem or end connector plate is also generally prepared by blowing the hole out with air pressure or otherwise cleaning it. Then one of several preferred procedures is employed to make the connection.

In one method, (illustrated by using copper as the electrical conductor and graphite as the carbon body) both the copper bar or rod and the graphite stem or plate are preheated to some convenient temperature above the melting point of the alloy being used. A quantity of molten alloy sufficient to fill the annular space is then poured into the hole in the graphite and the copper bar is placed in the hole. As the copper bar approaches the bottom of the hole and reaches the molten alloy the alloy is forced to rise around the copper bar and fills the annular space. The assembly is then allowed to cool to a temperature below the freezing or solidification point of the alloy to fix the copper bar in place.

By a second method a pellet of alloy (or alloy powder) sufficient to fill the annular space is placed in the bottom of a cleaned graphite stem or end connector plate and a tinned copper bar, prepared as before, is placed in the hole in the graphite on top of the pellet (or powder) of alloy, all being at room temperature. The assembly is then heated uniformly by a suitable method until the alloy pellet or powder melts and the molten alloy rises to fill the annular space. The assembly is then cooled to "freeze" or solidify the alloy.

By a third method the copper rod is prepared and tinned as before, the graphite is cleaned, a pellet of alloy (or alloy powder) put in the bottom of the hole in the graphite, and the copper bar placed in the hole on top of the pellet or powder of alloy, all being at room temperature. The assembly is then placed in a bath or container of impregnation wax which is molten because of having been heated above its melting point or above the melting point of the alloy. If the temperature of the wax is below the melting point of the alloy, the temperature of the wax is then raised to a point above the melting point of the alloy or to whatever impregnation temperature is desired, so long as it is a temperature above the melting point of the alloy. A procedure suitable for impregnation of the graphite with wax is then carried out. When the impregnation cycle is completed, the copper-graphite assembly is removed from the wax bath, being careful not to disturb the position of the copper bar in the graphite until the assembly has cooled enough to allow the alloy to freeze, fixing the copper bar in place. Impregnants other than wax, such as drying oils, may sometimes be used in this method.

The advantages of the type of copper to graphite or electrical conductor to carbon body connection made by the methods disclosed in this invention are: (1) the joints are tight and mechanically strong; (2) the joints have lower electrical resistance than joints made with solders containing tin and lead only and which do not expand upon cooling; and (3) the joints are cheaper to make from the standpoints of material and labor costs than joints made by other materials such as with copper amalgam, powdered lead or powdered solder, all of which materials must be pressed into place.

A further advantage is that if the third method of assembly is used, wherein the pellet of alloy is placed in the hole in the graphite, and the graphite stem or plate and the copper rod are assembled at room temperature, the separate step of making the copper to graphite connection after the impregnation step is eliminated, and the connection is made while the impregnation takes place. In other prior art methods using solders of tin and lead, the graphite has to be first impregnated and the hole then cleaned of impregnant before the connection is made. This is because if the attempt is made to first make the joint and then impregnate, the impregnation step melts the solder and makes a poor joint because the solder shrinks upon cooling and thus results in a high-resistance, low-strength joint. This does not happen with the alloys used in the present invention because they all expand upon cooling.

The following examples further illustrate the invention:

EXAMPLE 1

Eighteen anode stems (viz. copper conductors connected to graphite pins) were assembled and impregnated according to the aforedescribed third method. Twelve of these egihteen stems were made with a copper to graphite solder connection, said solder being 60% by weight tin and 40% by weight lead; in the remaining six stems the copper to graphite connections were made with an alloy containing 58% by weight of bismuth and 42% by weight of tin (alloy $a$). All eighteen stems were impregnated with wax by a vacuum-pressure cycle in an autoclave. After completion of the impregnation cycle and cooling to room temperature the voltage drop across the connection was measured on each pin while a direct current of 50 amperes was passed through the pin. The voltage drops found for the stems made with the bismuth-tin alloy averaged 1.5 millivolts lower than the voltage drops for the stems made with the lead-tin solder connections. The joints made with the bismuth-tin alloy were also stronger. This example shows that when using the present invention the separate step of making the copper to graphite connection can be eliminated and the connection can be made while the impregnation takes place; but that if this same technique is used with solders of the prior art, this results in joints of higher resistivity and lower strength.

EXAMPLE 2

Several anode stems were assembled according to the aforedescribed first method, using the antimony alloy which was 15% by weight of antimony, 58% by weight lead, 26% by weight tin and 1% by weight copper (alloy $d$). The voltage drops across the connections of these pins were very low when a direct current of 50 amperes was passed through the pins, indicating that the joints were of very low electrical resistance. The joints were also very strong. Similar results were also obtained when the alloys $b$, $c$ and $e$, consisting, respectively, of 55.5 parts by weight of bismuth and 44.5 parts lead; and of 48 parts bismuth, 28.5 parts lead, 14.5 parts tin and 9 parts antimony; and of 15 parts antimony, 82 parts lead and 3 parts tin; were used.

Several anode stems were also assembled according to the aforedescribed second method and using the alloys $a$-$e$. Results similar to those of Example 2 were obtained.

In use in the electrolytic cell, the lead-in rod assembly and the anode and the connection between same are seldom heated to temperatures above 80–90° C. Therefore, when used in an electrolytic cell, the alloy used to make the joint is not heated to a temperature above about 95° C., nor are such temperatures at all desirable or necessary. For any use, because the connection is made by heating the alloy up to elevated temperatures so as to cause the alloy to melt and then solidify upon cooling, the joint must be used below the melting point of the particular alloy used. As illustrated by the properties set forth of the alloys $a$-$e$, the melting point or range of the alloys used in the present invention vary from about 103° C. to about 280° C., or slightly less than about 300° C.

The joints of this invention are easily adaptable to lead-in pins of the threaded or non-threaded (e.g. pressed-fit) type, and can easily be prepared by the manufacturer of the anodes and/or the manufacturer of the lead-in pins as well as by the cell operators. In other words, if desired, the lead-in assembly of the copper rod and graphite pin can be prepared in advance and shipped to the cell operator and does not have to be prepared at the site of the cell. They (the cell operators) can also prepare the present joints.

It is desirable that the alloy employed in the making of the joint be cleansed of surface film or oxides. If this is not done, the joint resistance between the electrical conductor and lead-in rod (or between the copper rod and the graphite lead-in rod) is higher than if cleansed and the joint cannot as economically be employed in electrolytic cells or elsewhere, where low voltage drop or power loss is extremely important.

The low resistance joint of the present invention can be used in arts or fields other than the electrolytic cell art, for example in the carbon brush field, or in making a low-resistance coupling between any electrical conductor and a carbon body (so long as the temperature at which the joint is used, or joined members are used, does not exceed the melting point of the alloy employed), the use of the alloys of this invention for these purposes being considered new and unique with the present invention. Also, in this context, the term "carbon body" is intended to connote or include either baked (or amorphous) or semigraphitic or graphitized carbon bodies, impregnated or unimpregnated, which bodies also can vary greatly in their size and shape, density and porosity, and ultimate intended use. In certain instances, or for certain applications, the "carbon bodies" of this invention may also include minor amounts of materials other than strictly carbon or graphite, such as sintered metals. All such carbon bodies, however, are characterized by having a recess therein which is adapted for the insertion of the electrical conductor therein also for the hereindescribed alloys therebetween. The size and shape of the recess will be dependent upon the size and shape of the carbon body and also of the electrical conductor to be inserted in said recess. Most preferably the recess will be cylindrical and the electrical conductor to be inserted into same will also be cylindrical, with an annulus therebetween typically varying between about $\frac{1}{32}$ inch to about $\frac{5}{32}$ inch. However, the recess may also be rectangular, or square, etc., in cross-section, as can also the electrical conductor. Stiff metallic copper rods are preferred for the electrical conductor; however, metallic conductors in other forms such as stiff or flexible stranded wire may be employed by appropriately modified techniques in the making of the joint. In any case, however, the joint will be effected by melted alloys which exhibit a cumulative growth during and after solidification as previously described. Also, the space between the electrical conductor and recess wall may sometimes also be greater than $\frac{5}{32}$ inch or less than $\frac{1}{32}$ inch, dependent somewhat upon the depth of the recess in the carbon body and the degree of penetration of the conducting member into same and the strength of the joint required and the purpose or end use for the assembly. As previously pointed out, however, the thickness of the alloy in the recess is kept to a minimum consistent with attaining the required joint strength and accomplishing the purpose or end use for the assembly.

Having thus described the nature of our invention and the uses for same, but being limited only by the appended claims with respect to the scope of the invention, we claim:

1. In combination, a carbon body having a recess therein and an electrical conductor one end of which is embedded within the recess in said carbon body, and secured thereto by a solidified alloy which possesses a melting point between about 95° C. and about 300° C. and which alloy has been heated to a temperature above its melting point and which alloy has been permitted to cool below its melting point within said recess, said alloy exhibiting a cumulative growth during and after solidification thus causing a tight mechanical bond between the carbon body and the electrical conductor and thus forming a low resistance electrical connection of good strength, and said alloy being selected from the group consisting of the following compositions wherein the numbers are approximate percentages by weight:

58 bismuth, 42 tin;
    55.5 bismuth, 44.5 lead;
    48 bismuth, 28.5 lead, 14.5 tin, 9 antimony;
    15 antimony, 58 lead, 26 tin, 1 copper; and
    15 antimony, 82 lead, 3 tin.

2. A combination of a carbon body and electrical conductor according to claim 1 wherein the alloy used is 58 bismuth, 42 tin.

3. A combination of a carbon body and electrical conductor according to claim 1 wherein the alloy used is 55.5 bismuth, 44.5 lead.

4. A combination of a carbon body and electrical conductor according to claim 1 wherein the alloy used is 48 bismuth, 28.5 lead, 14.5 tin, 9 antimony.

5. A combination of a carbon body and electrical conductor according to claim 1 wherein the alloy used is 15 antimony, 58 lead, 26 tin, 1 copper.

6. A combination of a carbon body and electrical conductor according to claim 1 wherein the alloy used is 15 antimony, 82 lead, 3 tin.

7. A combination of a carbon body and electrical conductor according to claim 1 wherein the electrical conductor is a copper rod and wherein the carbon body is graphite.

References Cited

UNITED STATES PATENTS

| 667,498 | 2/1901 | Chapman | 204—286 |
|---|---|---|---|
| 674,933 | 5/1901 | Mauran | 204—288 |
| 728,274 | 5/1903 | Moore | 204—286 |
| 3,023,393 | 2/1962 | Oliver | 204—279 XR |
| 3,244,610 | 4/1966 | Brown et al. | 204—279 |

JOHN H. MACK, Primary Examiner

D. R. JORDAN, Assistant Examiner

U.S. Cl. X.R.

204—294, 297